United States Patent [19]

Rossell

[11] 3,862,437

[45] Jan. 21, 1975

[54] SAMPLE PEAK AND HOLD WITH DUAL CURRENT SOURCE

[75] Inventor: Allen J. Rossell, Detroit, Mich.

[73] Assignee: Burroughs Corporation, Detroit, Mich.

[22] Filed: Sept. 4, 1973

[21] Appl. No.: 393,886

[52] U.S. Cl. .............. 307/235 R, 307/246, 307/254, 307/296

[51] Int. Cl. .............. H03k 17/00

[58] Field of Search .............. 328/151, 150; 307/235, 307/235 A, 246, 296, 254

[56] References Cited

UNITED STATES PATENTS

| | | | |
|---|---|---|---|
| 3,478,225 | 11/1969 | Parker et al. | 328/151 X |
| 3,694,668 | 9/1972 | Foerster | 328/151 |
| 3,701,909 | 10/1972 | Holmes | 328/151 |

*Primary Examiner*—Stanley D. Miller, Jr.
*Assistant Examiner*—B. P. Davis
*Attorney, Agent, or Firm*—Alan Petlin Klein; Kenneth Watov; William B. Penn

[57] ABSTRACT

A sample peak and hold circuit comprising a dual current source biased by two comparator-driven transistor switches to initially provide a high charging current to a storage capacitor until the capacitor charges to a predetermined percentage of the input signal peak voltage; and then to complete the charging of the capacitor with a lower charging current, until the capacitor charge reaches a magnitude proportional to the input signal peak voltage amplitude. Another transistor switching network is used to discharge the capacitor and an emitter-follower in the output stage prevents premature discharging of the capacitor. Digital logic drives the transistor switches in providing the necessary control functions for charging or discharging the capacitor, or for placing the circuit in a holding condition, as is required within and without successive sampling periods.

29 Claims, 1 Drawing Figure

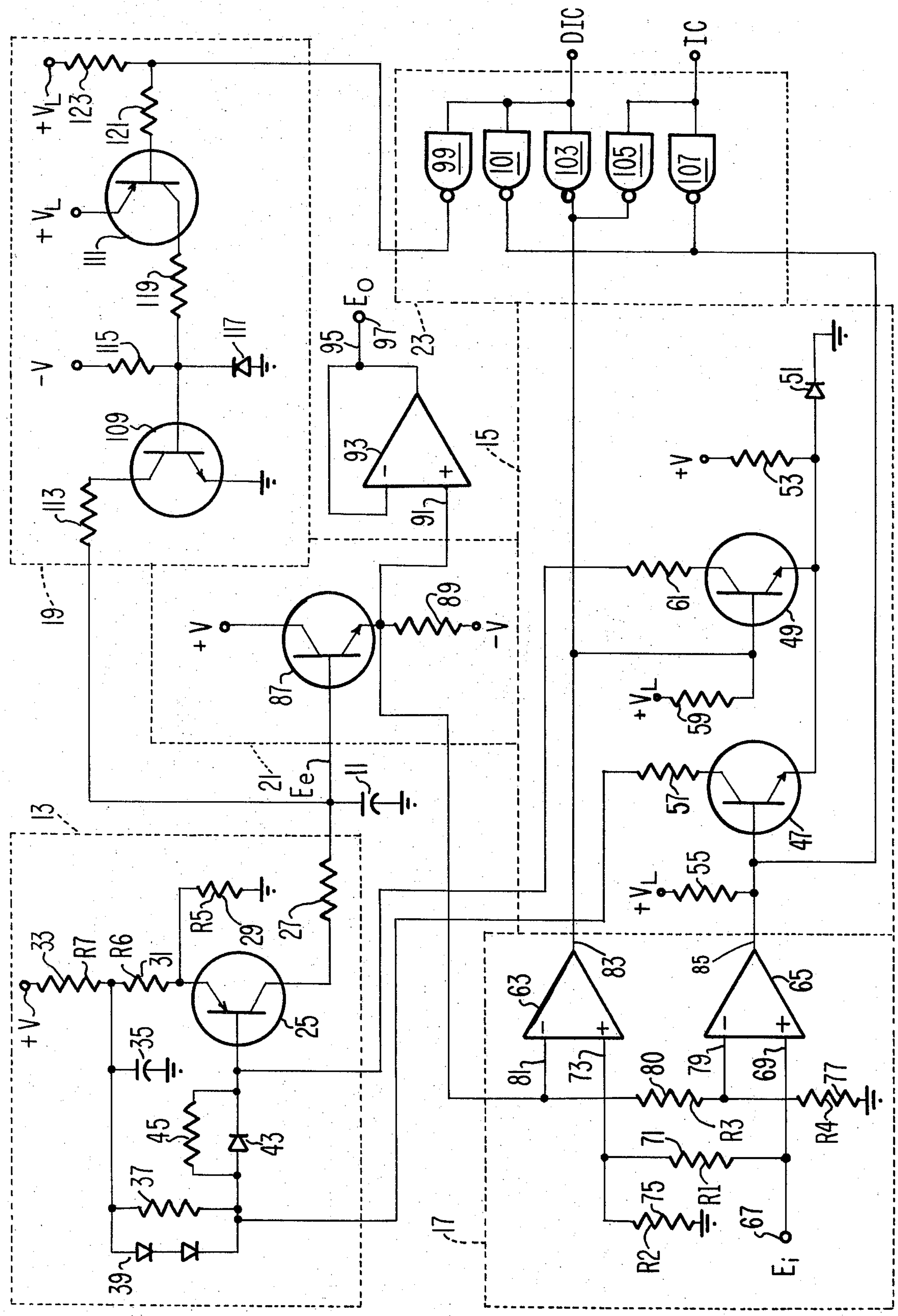
DIC
IC
+VL
+V
-V
Eo
Ee
Ei
R1
R2
R3
R4
R5
R6
R7

SAMPLE PEAK AND HOLD WITH DUAL CURRENT SOURCE

BACKGROUND OF THE INVENTION

This invention relates generally to signal sampling circuits, and more specifically to a circuit for sampling, holding and outputting a signal proportional to the peak amplitude of a rectified or alternating current input signal. In general, the invention provides an analogue output signal that is proportional in amplitude to the largest peak amplitude of an input signal occurring within a given sampling time period. The invention is primarily used in magnetic ink character recognition systems for detecting 23 kHz magnetic read head signals representative of successive individual characters identified by correlation to their peak signal amplitudes.

Prior art sample peak and hold circuits employ current sources with one charging current rate. Overshoot or excessive charging of a capacitor by such systems is a common problem, causing an error in the absolute value output signal. Many of these systems require a gating signal that occurs in time synchronization with the occurrence of the peak signal amplitude.

One prior art high frequency sample peak and hold system is disclosed in Holmes U.S. Pat. No. 3,701,909, wherein the system includes digital and analogue circuitry for detecting when the derivative of an input signal is equal to zero; to output a gating signal when the peak amplitude represented thereby occurs; to store the magnitude of the input signal in a first capacitor; and to transfer the first capacitor charge, at the time of occurrence of the peak amplitude, to a second capacitor included in a holding circuit.

Another prior art peak detector, disclosed in Eubanks U.S. Pat. No. 3,328,705, includes a system wherein the AC signal of interest is inputted through an operational amplifier to parallel and oppositely polarized diodes, and is also inputted to a differentiator. The diode network feeds a charging capacitor and an output operational amplifier, the output amplifier being used to drive a load and a feedback network back to the input operational amplifier. The output of the output amplifier is representative of a peak amplitude of the AC input signal. The output of the differentiator drives a threshold detecting circuit, which outputs a pulse to a third operational amplifier, for outputting pulse signals representative of the time of occurrence of the peak amplitude.

Caveney et al U.S. Pat. No. 3,659,117 discloses a track and hold apparatus for sampling a video analogue input signal. The apparatus includes a constant current source for driving a diode switching bridge as a function of the video analogue input, the signal input being fed through an input buffer means having a constant power dissipation, the switching bridge being coupled to a holding capacitor which is switched off at a common level by turn-off clamps whose turn-off level is varied by the stored amplitude level of the holding capacitor. Appropriate feedback from the holding capacitor to the clamps permits turn-off when the input and holding voltages correspond.

There are many variations of sample peak and hold systems in the prior art.

SUMMARY OF THE INVENTION

Accordingly, with these prior art problems in mind, it is an object of this invention to improve sample peak and hold circuits.

Another object of this invention is to eliminate from peak and hold circuits a gating signal synchronous with the input signal peak amplitude time occurrence.

A further object of the invention is to charge the storage capacitor of a peak and hold circuit to a peak value without overshooting.

These and other objects and advantages are accomplished in a system including a current source for charging a capacitor to the largest peak value of an input signal occurring within a given sampling period wherein the current source is operated in dual modes through the use of comparator-driven transistor switches, to initially bias the current source to operate at a high charging rate, and thereafter at a low charging rate until the capacitor is proportionately charged to the largest peak amplitude.

A logic network is used to control the transistor switches in inhibiting charging to place the circuit in a holding condition, and to selectively energize a discharge network for discharging the capacitor.

BRIEF DESCRIPTION OF THE DRAWING

The foregoing objects and advantages of the invention, together with other advantages, which may be attained by its use, will be apparent from the following detailed description of the invention read in conjunction with the drawing which is a schematic diagram of the sample peak and hold circuit of the invention.

DETAILED DESCRIPTION OF THE INVENTION

The sample peak and hold circuit with dual current source of the invention, as shown in the drawing, comprises a storage capacitor 11, a current source 13, a switching network 15, a voltage comparator network 17, a discharge network 19, an output emitter-follower 21, and a logic network 23.

The current source 13 includes a PNP transistor 25, with its collector connected through a resistor 27 to the storage capacitor 11, the other side of the capacitor 11 being grounded. The emitter of transistor 25 is connected to a grounding resistor 29, and through two series-connected resistors 31, 33 to a positive voltage source. The junction of the two series-connected resistors 31, 33 is connected to a grounded AC stabilization capacitor 35 and to one end of a parallel circuit including a resistor 37 in parallel with two series-connected diodes 39, 41, the other end of the parallel circuit being connected to a third diode 43 in parallel with a resistor 45. The diodes 39, 41, 43 are all unidirectionally connected and the cathode of the parallel connected diode 43 is connected to the base of the PNP transistor 25.

The resistors 37, 45 in parallel with the diodes 39, 41 and 43 respectively, as described above, ensure that the base-emitter junction of the PNP transistor 25 is held at cutoff potential, whenever the diodes are not drawing current. If the resistors 37, 45 were not used in parallel with the diodes, leakage current might flow through the transistor 25, causing erroneous charging of the capacitor 11.

The switching network 15 includes two NPN transistors 47, 49 with their emitters connected to the anode of a grounded diode 51 and through a resistor 53 to a positive voltage supply. One of the NPN transistors 47 is designated as the low charging current switch, wherein its base is connected to the logic network 23 and comparator network 17, and through a resistor 55 to a positive logic voltage $+V_L$. The collector of the low charging current switch 47 is connected through a resistor 57 to the anode of diode 43 of the current source 13. The other NPN transistor 49 is designated as the high charging current switch, wherein its base is also connected to the logic network 23 and comparator network 17, and through a resistor 59 to the positive logic voltage $+V_L$. However, the collector of the high charging current switch is connected through a resistor 61 to the cathode of diode 43 and the base of the transistor 25 of the current source 13.

Two differential voltage comparators 63, 65 are included in the comparator network 17. The current input signal is conducted through terminal 67 directly to the non-inverting input 69 of one of the differential comparators 65 designated as the low-charging current comparator, and through an input resistor 71 to the non-inverting input 73 of the other comparator 63 designated as the high-charging current comparator. Grounding resistors 75, 77 are connected to the non-inverting input 73 of the high-current comparator 63, and to the inverting input 79 of the low-current comparator 65, respectively. A resistor 80 interconnects the inverting inputs 79,81 of the comparators 65,63, the inverting input 81 of the high-current comparator 63 also being connected to the output emitter-follower 21. The high-and low-current comparator outputs 83, 85 are connected to the bases of their respective high and low current switches 49, 47.

An NPN transistor 87, which should be high gain and high speed, is included in the output emitter-follower 21, with its collector being connected to a positive voltage supply; its base being connected to the storage capacitor 11; and its emitter being connected to the inverting input 81 of the high current comparator, and through an emitter resistor 89 to a negative voltage supply. The emitter of transistor 87 is also connected to the non-inverting input 91 of a differential amplifier 93 wired as a signal-follower with its output 95 connected to the sampling circuit output terminal 97. The signal-follower amplifier 93 provides electrical isolation between the emitter-follower 21 output and the load, and also provides power amplification. In the preferred embodiment, the signal follower should be included, but it can be eliminated for high-impedance loads.

The logic network 23 includes five NAND gates 99, 101, 103, 105, 107. Three of the NAND gates 99, 101, 103 having their inputs interconnected to a "Discharge-Inhibit Charging" (DIC) signal control line. The output of one of the latter NAND gates 99 is connected to the discharge network 19; the output of a second one of the latter NAND gates 101 is connected to the base of the low current switch 47; and the output of the third NAND gate 103 is connected to the base of the high current switch 49 and the output 83 of the comparator 63. The fourth and fifth NAND gates 105, 107 have their inputs interconnected to an "Inhibit Charge" (IC) signal control line and their outputs connected, respectively, to the outputs of the third and second NAND gates 103, 101.

The discharge network 19 includes an NPN transistor 109 and a PNP transistor 111. The NPN transistor 109 has its emitter grounded, its collector interconnected through a resistor 113 to the storage capacitor 11; and its base connected through a resistor 115 to a negative voltage supply, through the cathode of a diode 117 to ground, and through a resistor 119 to the collector of the PNP transistor 111. Diode 117 with resistor 115 set up a reverse bias on transistor 109 to keep its collector voltage low. The PNP transistor has its emitter connected to a positive logic voltage $+V_L$, and its base connected through two series resistors 121, 123 to the positive logic voltage $+V_L$, the junction of the resistors being connected to the output of the first NAND gate 99 of the logic network 23.

At the initiation of a given sampling period, the DIC and IC signals are low, causing the NAND gates 99, 101, 103, 105, 107 to have high outputs, permitting the high and low current comparators 63, 65 to control their respective high and low current switches 49, 47.

If the input signal amplitude at terminal 67 is initially at ground, the comparator outputs 83, 85 are low, causing their respective switches 49,47 to be cutoff, preventing the current source 13 from charging the capacitor 11, thus causing the circuit output signal Eo to be of zero volt amplitude. As the input signal amplitude increases to a peak, both comparator outputs 83, 85 will go high, turning on their respective transistor switches 49, 47, causing high and low forward biasing currents to be applied to the current source 13, wherein the high bias will prevail to bias the current source 13 into a high charging current state for initial charging of the capacitor 11.

The output signal Ee, representative of the charge upon the capacitor at any given time, is fed back to the comparators 63, 65 from the output emitter-follower 21, for comparison with the input signal Ei amplitude. With respect to the comparator network 17, and designating resistor 71 as R1, resistor 75 as R2, when the output signal Eo reaches an amplitude value equal to the input signal Ei times the quantity $[R2/(R1+R2)]$, that is $Eo=Ei[R2/(R1+R2)]$, the output of the high current comparator 63 goes low, turning off its respective high current switch 49. The current source 13 is now being biased by the low current switch 47, and as a result continues charging the capacitor with a low charging current. Designating resistor 80 as R3 and resistor 77 as R4, when the output signal Eo amplitude obtains a value of $Ei[1+(R3/R4)]$, the output of the low current comparator 65 will go low, cutting off the low current switch 47, which in turn removes the low-current forward bias from the current source 13.

The transistor 25 of current source 13 is now biased off by a reverse bias voltage at its emitter-base junction, which also insures that its collector leakage current is low. Designating resistor 29 as R5, resistor 31 as R6, and resistor 33 as R7, the emitter-base reverse bias voltage is equal to the quantity $[+V(R6)/R5+R6+R7)]$.

The circuit will now remain in a standby condition until the end of the sampling period, unless the input voltage amplitude incurs a new peak amplitude which exceeds the value of $Eo[R4/(R3+R4)]$, wherein the low current comparator 65 output will go high, turning on the low current switch 47, which in turn biases the current source 13 on to charge the capacitor 11 with a low charging current. Similarly, if the input voltage peak amplitude increases to a value equal to $Eo[(R1+R2)/R2]$, the high current comparator 63 output will go high, turning on the high current transistor switch 49, to bias the current source 13 to increase the capacitor charge at a high charging rate. The cycle from a high charging rate (if obtained), to a low charging rate, to a standby condition is repeated.

When the sampling time period has terminated, the IC signal line goes high, causing the outputs of the fourth and fifth NAND gates 105, 107 to go low, to insure that the transistor switches will remain cutoff, placing the circuit in a holding condition. At the initiation of the next sampling period, IC will go low to remove the holding condition.

Between sampling periods, the DIC signal line will go high to energize the discharge network 19, and to retain the low and high current transistor switches 47, 49 in cutoff. When DIC goes high, the first NAND gate 99 output will go low energizing the PNP transistor 111 of discharge network 19 which in turn energizes NPN transistor 109, causing the capacitor 11 to discharge through the collector resistor 113 and NPN transistor 109 to ground. Upon discharge of the capacitor 11, and prior to the next sampling period, the DIC signal line will go low.

The output signal Eo can be larger than the largest peak input signal Ei, incurred during a given sampling period. Gain is determined by the relative values of R3 and R4, and is equal to the quantity [1+R3/R4)], wherein:

Eo=Ei max. [1+(R3/R4)]

In the preferred embodiment the storage capacitor 11 is a metallized mylar type capacitor. Such capacitors are very stable as to retention of a charge, due to their inherently low internal resistance. Also the diodes 39, 41, 43 of current source 13 are preferably high speed switching diodes.

What is claimed is:

1. A circuit for charging a capacitor to a predetermined percentage of the peak amplitude of an input signal comprising:

voltage sensitive means coupled to said capacitor and receiving said input signal for comparing the charge on said capacitor with said input signal and for identifying a first level of charge and a second level of charge on said capacitor as percentages of peak amplitude of said input signals;

means for supplying current at a high-charging rate and current at a low-charging rate to said capacitor;

first means activable by said voltage sensitive means for controlling said current-supplying means to provide current at said high-charging rate to said capacitor up to said first level of charge when said first activable means is activated;

second means activable by said voltage sensitive means for controlling said current-supplying means to provide current at said low-charging rate to said capacitor up to said second level of charge when said second activable means is activated and said first activable means is inactivated;

said current-supplying means being disabled when said first and second activable means are both inactivated.

2. The charging circuit of claim 1, wherein said voltage sensitive means includes:

first and second voltage dividers for respectively determining said first and second levels of charge; and first and second differential comparators for respectively identifying said first and second levels of charge, each of said comparators having a non-inverting input and an inverting input, said non-inverting input of said second comparator receiving said input signal and being coupled to the non-inverting input of said first comparator through said second voltage divider, and the inverting input of said first comparator being coupled to said capacitor and through said first voltage divider to the inverting input of said second comparator.

3. The charging circuit of claim 1, wherein said current-supplying means comprises variable impedance means including:

a main current-carrying circuit for interconnecting a voltage source to said capacitor; and a control circuit interconnecting said main current-carrying circuit and said first and second activable means for controlling said current-supplying means.

4. The charging circuit of claim 3, wherein the main current-carrying circuit of said variable impedance means includes:

a solid-state current control element having a first main current-carrying electrode resistively coupled to said capacitor, and a second main current-carrying electrode for interconnection to a voltage source.

5. The charging circuit of claim 4, wherein the control circuit of said variable impedance means further includes: a control electrode for said solid-state element; and a unidirectional connection between said second main current-carrying electrode and said control electrode of said solid-state element.

6. The charging circuit of claim 5, wherein said unidirectional connection includes a first parallel circuit having a resistive element and a unidirectional impedance element in parallel.

7. The charging circuit of claim 6, wherein said solid-state current-control element is a PNP transistor and wherein said variable impedance means further includes a third voltage divider for interconnecting the emitter of said transistor to positive voltage source, and wherein said control circuit further includes a second parallel circuit including diode means and a second resistive element in parallel for obtaining a predetermined voltage drop, said second parallel circuit being connected between said first parallel circuit and said third voltage divider.

8. The charging circuit of claim 6, wherein said first activable means is a first switching means driven by the output of said first differential comparator for placing said variable impedance means in a high-current mode when said first switching means is conductive; and said second activable means is a second switching means driven by the output of said second differential comparator for placing said variable impedance means in a low current mode, when said second switching means is conductive and said first switching means is nonconductive; said main current-carrying circuit being disabled when both said first and second switching means are nonconductive, the charging circuit thereby being in a standby condition.

9. The charging circuit of claim 8, wherein:

said first switching means, when conductive, interconnects a reference potential to said unidirectional connection of said variable impedance means between one end of said first parallel circuit and said control electrode; and said second switching means, when conductive, interconnects a reference potential to said unidirectional connection at the other end of said first parallel circuit.

10. A sample, peak and hold circuit comprising:

a storage capacitor;

voltage sensitive means coupled to said capacitor and receiving an input signal for comparing the charge on said capacitor with said input signal and for identifying a first level of charge and a second level of charge on said capacitor as percentages of peak amplitude of said input signals;

means for supplying a high-charging current and a low-charging current to said capacitor;

means connected between said voltage-sensitive means and said current-supplying means, and driven by said voltage sensitive means, for controlling said current-supplying means to initially provide said high-charging current to said capacitor up to said first level of charge, to next provide said low-charging current up to said second level of charge on said capacitor, and thereafter to disable said current-supplying means, placing said circuit in a standby condition;

means connected to said capacitor for outputting a voltage representative of the charge upon said capacitor, while substantially maintaining said capacitor charge;

means for discharging said capacitor;

means for simultaneously actuating said discharging means and disabling said current-supplying means through said controlling means; and means independent of said actuating and disabling means for disabling said current-supplying means through said controlling means to place said sample peak and hold circuit in a holding condition.

11. The sample peak, and hold circuit of claim 10, wherein said voltage sensitive means includes:

first and second voltage dividers for respectively determining said first and second levels of charge; and first and second differential comparators for respectively identifying said first and second levels of charge, each of said comparators having a non-inverting input and an inverting input, said non-inverting input of said second comparator receiving said input signal and being coupled to the non-inverting input of said first comparator through said second voltage divider, and the inverting input of said first comparator being coupled to an output of said outputting means and through said first voltage divider to the inverting input of said second comparator.

12. The sample, peak, and hold circuit of claim 10, wherein said current-supplying means comprises variable impedance means including:

a main current-carrying circuit for interconnecting a voltage source to said capacitor; and a control circuit interconnecting said main current-carrying circuit and said means for controlling said current-supplying means.

13. The sample, peak, and hold circuit of claim 12, wherein the main current-carrying circuit of said variable impedance means includes:

a solid-state current control element having a first main current-carrying electrode resistively coupled to said capacitor, and a second main current-carrying electrode for interconnection to a voltage source.

14. The sample, peak, and hold circuit of claim 13, wherein the control circuit of said variable impedance means, further includes:

a control electrode for said solid-state element; and a unidirectional connection between said second main current-carrying electrode and said control electrode of said solid-state element.

15. The sample, peak, and hold circuit of claim 14, wherein said unidirectional connection includes a first parallel circuit having a resistive element and a unidirectional impedance element in parallel.

16. The sample, peak, and hold circuit of claim 15, wherein said solid-state current control element is a PNP transistor and wherein said variable impedance further includes a third voltage divider for interconnecting the emitter of said transistor to a positive voltage source, and wherein said control circuit further includes a second parallel circuit including diode means and a second resistive element in parallel, for obtaining a predetermined voltage drop, said second parallel circuit being connected between said first parallel circuit and said third voltage divider.

17. The sample, peak, and hold circuit of claim 15, wherein said means for controlling said current-supplying means includes:

first switching means driven by the output of said first differential comparator for placing said variable impedance means in a high-current mode when said first switching means is conductive; and second switching means driven by the output of said second differential comparator for placing said variable impedance means in a low-current mode, when said second switching means is conductive and said first switching means is nonconductive;

said main current-carry circuit being disabled when both said first and second switching means are nonconductive, the charging circuit thereby being in a standby condition.

18. The sample, peak, and hold circuit of claim 17, wherein said first switching means, when conductive, interconnects a reference potential to said unidirectional connection of said variable impedance means between one end of said first parallel circuit and said control electrode; and said second switching means, when conductive, interconnects a reference potential to said unidirectional connection at the other end of said first parallel circuit.

19. The sample, peak, and hold circuit of claim 10, wherein said outputting means includes a transistorized emitter-follower amplifier.

20. The sample, peak, and hold circuit of claim 17, wherein said discharging means includes:

third switching means connected between said capacitor and said means for simultaneously actuating said discharging means and disabling said controlling means, said third switching means operating to resistively ground said capacitor.

21. The sample, peak, and hold circuit of claim 20, wherein said means for simultaneously actuating said discharging means and disabling said current-supplying means through said controlling means includes first logic means.

22. The sample, peak, and hold circuit of claim 21, wherein said first logic means includes:

first, second, and third NAND gates, the inputs of said NAND gates being adapted to receive a first control signal;

the outputs of said first and second NAND gates being connected to said first and second switching means respectively; and the output of said third NAND gate being connected to said third switching means.

23. The sample, peak, and hold circuit of claim 22 wherein said independent means for placing said sample peak and hold circuit in a holding condition includes second logic means.

24. The sample, peak, and hold circuit of claim 23, wherein said second logic means includes:

third and fourth NAND gates, the inputs of said third and fourth NAND gates being adapted to receive a second control signal; and the outputs of said third and fourth NAND gates being connected to said first and second switching means respectively.

25. The dual-current source of claim 24, wherein said unidirectional connection includes a parallel circuit having a resistive element and a unidirectional impedance means in parallel.

26. The dual current source of claim 25 wherein said first activable means is a first switch resistively connecting one end of said parallel circuit and the base of said transistor to ground for biasing said transistor into the high current mode when said first switch is conductive; and said second activable means is a second switch resistively connecting the other end of said parallel circuit to ground for biasing said transistor into the low-current mode, when said second switch is conductive and said first switch is non-conductive; said transistor being placed in a cut-off mode when said first and second switches are both non-conductive.

27. The dual-current source of claim 26, wherein said unidirectional impedance is a first diode having its cathode connected to the base of said transistor; and wherein said biasing circuit further includes diode means and a second resistive element in parallel connected in series between the anode of said first diode and said resistive voltage divider.

28. A dual-current source for selectively applying different magnitudes of current to a load comprising:

a PNP transistor having its emitter coupled through a resistive voltage divider to a positive voltage source, and its collector connected to said load;

a biasing circuit having a unidirectional connection between the base of said transistor and said voltage divider;

first activable means for controlling said biasing circuit to place said transistor in a high-current mode when said first activable means is activated; and second activable means for controlling said biasing circuit to place said transistor in a low-current mode when said second activable means is activated and said first activable means is inactivated;

said transistor being placed in a cutoff mode by said biasing circuit when said first and second activable means are both inactivated.

29. A dual-current source for selectively applying different magnitudes of current to a load, comprising:

a positive voltage source;

a PNP transistor having a collector, an emitter, and a base electrode, the collector electrode of said transistor being connected to said load;

a first resistor;

a second resistor joined in series with said first resistor to form a voltage divider, said voltage divider being connected between the positive voltage source and the emitter electrode of said transistor;

a biasing circuit having a unidirectional connection between the base of said transistor and the junction of said first and second resistors in said voltage divider;

first activable means for controlling said biasing circuit to place said transistor in a high current mode when said first activable means is activated; and second activable means for controlling said biasing circuit to place said transistor in a low current mode when said second activable means is activated and said first activable means is inactivated;

said transistor being placed in a cut-off mode by said biasing circuit when said first and second activable means are both inactivated.

* * * * *

UNITED STATES PATENT OFFICE

CERTIFICATE OF CORRECTION

PATENT NO. : 3,862,437

DATED : January 21, 1975

INVENTOR(S) : Allen J. Rossell

It is certified that error appears in the above-identified patent and that said Letters Patent are hereby corrected as shown below:

Claim 25, Column 9, line 20, change "claim 24" to read --claim 29--.

Signed and Sealed this

*twenty-second* Day of *July 1975*

[SEAL]

*Attest:*

RUTH C. MASON
*Attesting Officer*

C. MARSHALL DANN
*Commissioner of Patents and Trademarks*